US007780515B2

(12) United States Patent
Okada

(10) Patent No.: US 7,780,515 B2
(45) Date of Patent: Aug. 24, 2010

(54) GAMING MACHINE

(75) Inventor: Kazuo Okada, Tokyo (JP)

(73) Assignee: Universal Entertainment Corporation, Koto-ku, Tokyo (JP)

( * ) Notice: Subject to any disclaimer, the term of this patent is extended or adjusted under 35 U.S.C. 154(b) by 718 days.

(21) Appl. No.: 11/507,610

(22) Filed: Aug. 22, 2006

(65) Prior Publication Data

US 2007/0060264 A1 Mar. 15, 2007

(30) Foreign Application Priority Data

Aug. 23, 2005 (JP) ............................ 2005-241384

(51) Int. Cl.
*A63F 13/00* (2006.01)

(52) U.S. Cl. ............................ 463/20; 463/16; 463/21; 463/25; 463/26

(58) Field of Classification Search .................. 463/16, 463/20, 21, 25–26, 31
See application file for complete search history.

(56) References Cited

U.S. PATENT DOCUMENTS 5,123,649 A * 6/1992 Tiberio .................. 273/143 R
5,401,023 A * 3/1995 Wood .......................... 463/13
6,155,925 A * 12/2000 Giobbi et al. ................. 463/20
6,213,877 B1 * 4/2001 Walker et al. ................. 463/26
6,589,115 B2 * 7/2003 Walker et al. ................. 463/25
7,329,179 B2 * 2/2008 Baerlocher ................... 463/20
7,419,430 B1 * 9/2008 Joshi et al. ..................... 463/27
2003/0060266 A1 * 3/2003 Baerlocher ................... 463/20
2003/0162585 A1 8/2003 Bigelow, Jr. et al.
2005/0009601 A1 1/2005 Manfredi et al.
2005/0239537 A1 * 10/2005 Ogiwara ...................... 463/17

FOREIGN PATENT DOCUMENTS

JP 2003-220169 8/2003

OTHER PUBLICATIONS

Macao Chinese Office Action dated Aug. 27, 2007 with English Translation.

* cited by examiner

*Primary Examiner*—James S. McClellan
*Assistant Examiner*—Sunit Pandya
(74) *Attorney, Agent, or Firm*—McGinn IP Law Group, PLLC

(57) ABSTRACT

A gaming machine includes: a display; an operation unit that allows a player to input operations; a controller that performs game process for providing a game to the player by displaying a progress of the game on the display in accordance with the operations input through the operation unit; and a storage that stores information indicating a first magnification and a second magnification that is larger than the first magnification. The controller performs the game process including: accepting an input of a bet of a game value on the game through the operation unit; selecting one of the first magnification and the second magnification based on an amount of the game value bet on the game; and paying out an award that is determined by multiplying the game value bet on the game by the selected one of the first magnification and the second magnification. The controller performs selecting the second magnification when the amount of the game value bet on the game is equal to or more than a predetermined value.

19 Claims, 17 Drawing Sheets

FIG. 10

1000

| BETTING TARGET | PREDETERMINED VALUE | BET MAGNIFICATION | |
|---|---|---|---|
| | | NORMAL BET MAGNIFICATION | HIGHER BET MAGNIFICATION |
| TIE | 100 | 100 | 18 |
| BANKER | 100 | 1.95 | 3.9 |
| PLAYER | 100 | 2 | 42 |

GAMING MACHINE

CROSS-REFERENCE TO THE RELATED APPLICATION(S)

The present application is based upon and claims priority from prior Japanese Patent Application No. 2005-241384, filed on Aug. 23, 2005, the entire contents of which are incorporated herein by reference.

TECHNICAL FIELD

The present invention relates to a gaming machine for allowing a player to bet a game value on a game and enabling the player to obtain the game value of the amount responsive to the bet game value when the player wins the game.

BACKGROUND

A gaming machine for enabling a player to play a casino game more easily comes into widespread use on the market. As an example of such a gaming machine, a gaming machine for enabling the player to play baccarat is also realized (for example, see JP-A-2003-220169). The gaming machine adopts a function of presenting the past win occurrence trend of game table in a tabulation format in an easy-to-see manner for game participants.

The gaming machine described above follows a conventional casino game with respect to the gaming manner (bet betting targets such as "Tie," "Player," and "Banker" and a bet magnification for each betting target (a factor by which the bet amount is multiplied to determine an award if the player wins the game)). Thus, the number of the bet betting targets is small (three) and the bet magnification determined for each of the bet betting targets does not become so high and therefore the player of the gaming machine cannot expect a high award.

Then, to increase the game play wish of the player, it is also possible to set a high bet magnification. However, if a high bet magnification is always provided, a problem of the payout amount to the player exceeding the input amount from the player, namely, a problem of a rise in the payout rate occurs.

SUMMARY

One of objects of the present invention to provide a gaming machine that controls the payout rate while giving the possibility of obtaining a high award to a player in a situation where the player is allowed to play a traditional game such as baccarat.

According to an aspect of the invention, there is provided a gaming machine including: a display; an operation unit that allows a player to input operations; a controller that performs game process for providing a game to the player by displaying a progress of the game on the display in accordance with the operations input through the operation unit; and a storage that stores information indicating a first magnification and a second magnification that is larger than the first magnification. The controller performs the game process including: accepting an input of a bet of a game value on the game through the operation unit; selecting one of the first magnification and the second magnification based on an amount of the game value bet on the game; and paying out an award that is determined by multiplying the game value bet on the game by the selected one of the first magnification and the second magnification. The controller performs selecting the second magnification when the amount of the game value bet on the game is equal to or more than a predetermined value.

BRIEF DESCRIPTION OF THE DRAWINGS

In the accompanying drawings:

FIG. 10 is a drawing to show a data structure example of a bet magnification table;

DETAILED DESCRIPTION

Referring now to the accompanying drawings, there is shown an embodiment of the invention.

1. Appearance of Gaming Machine

Figure 1:
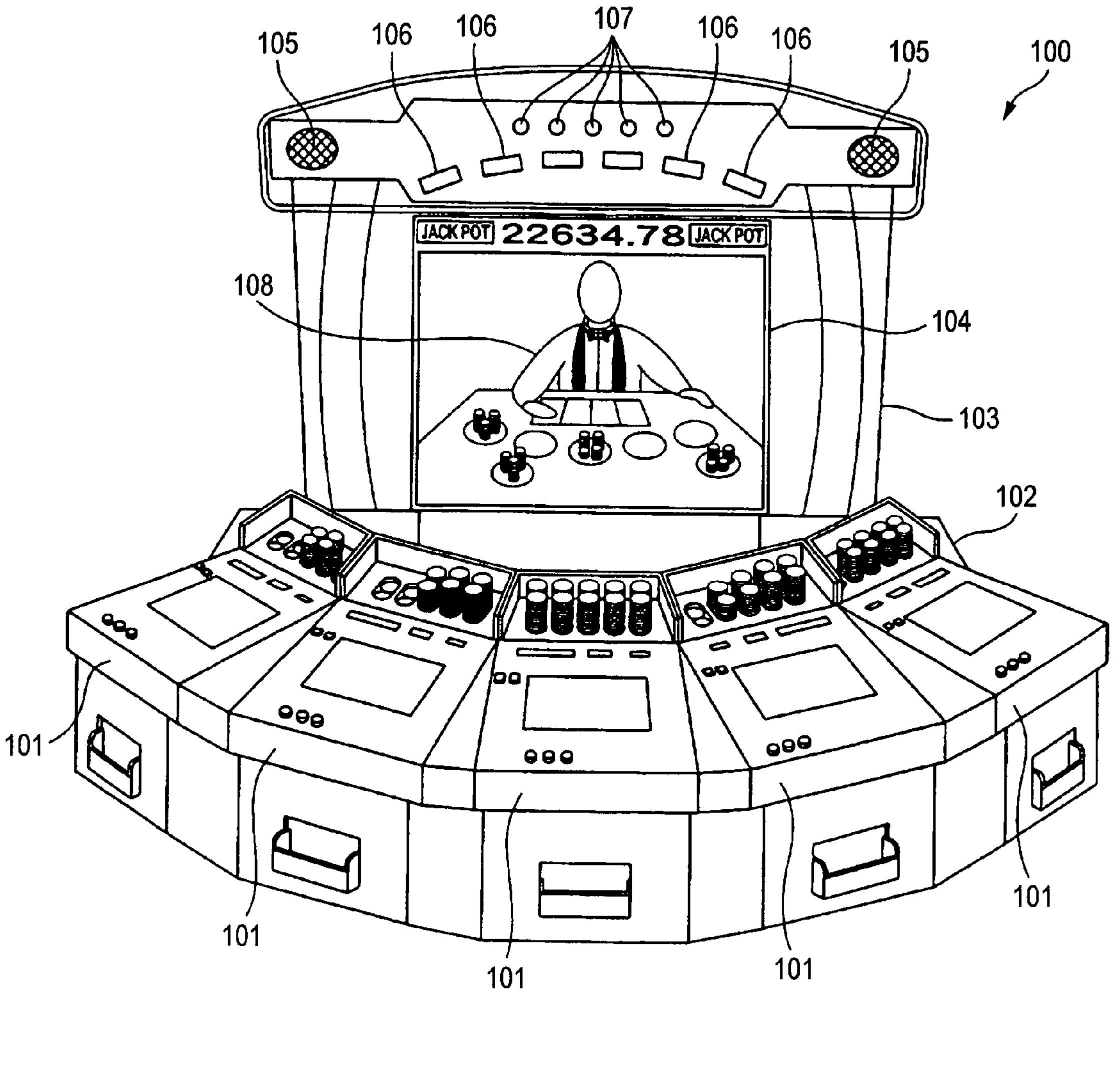
FIG. 1 is an external perspective view of a gaming machine.

FIG. 1 is an external view to show the appearance of a gaming machine according to an embodiment of the invention. As shown in the figure, a gaming machine 100 has a table section 102 and a panel section 103 placed at the rear of the table section 102. The table section 102 includes a plurality of player terminals 101, which are called satellites, are placed roughly a fan-like arrangement. In the example shown in the figure, five player terminals 101 are placed like a fan toward the panel section 103.

The panel section 103 includes: a front display 104 having a display device such as a liquid crystal display; speakers 105; lamps 106; and LEDs 107. The front display 104 notifies the players in common of information concerning the game in general joined by the players operating the player terminals 101. Notification of the bet table time start, notification of the bet end, notification of a win or a loss of the game, and the like are displayed as animation of a dealer 108.

Figure 2:
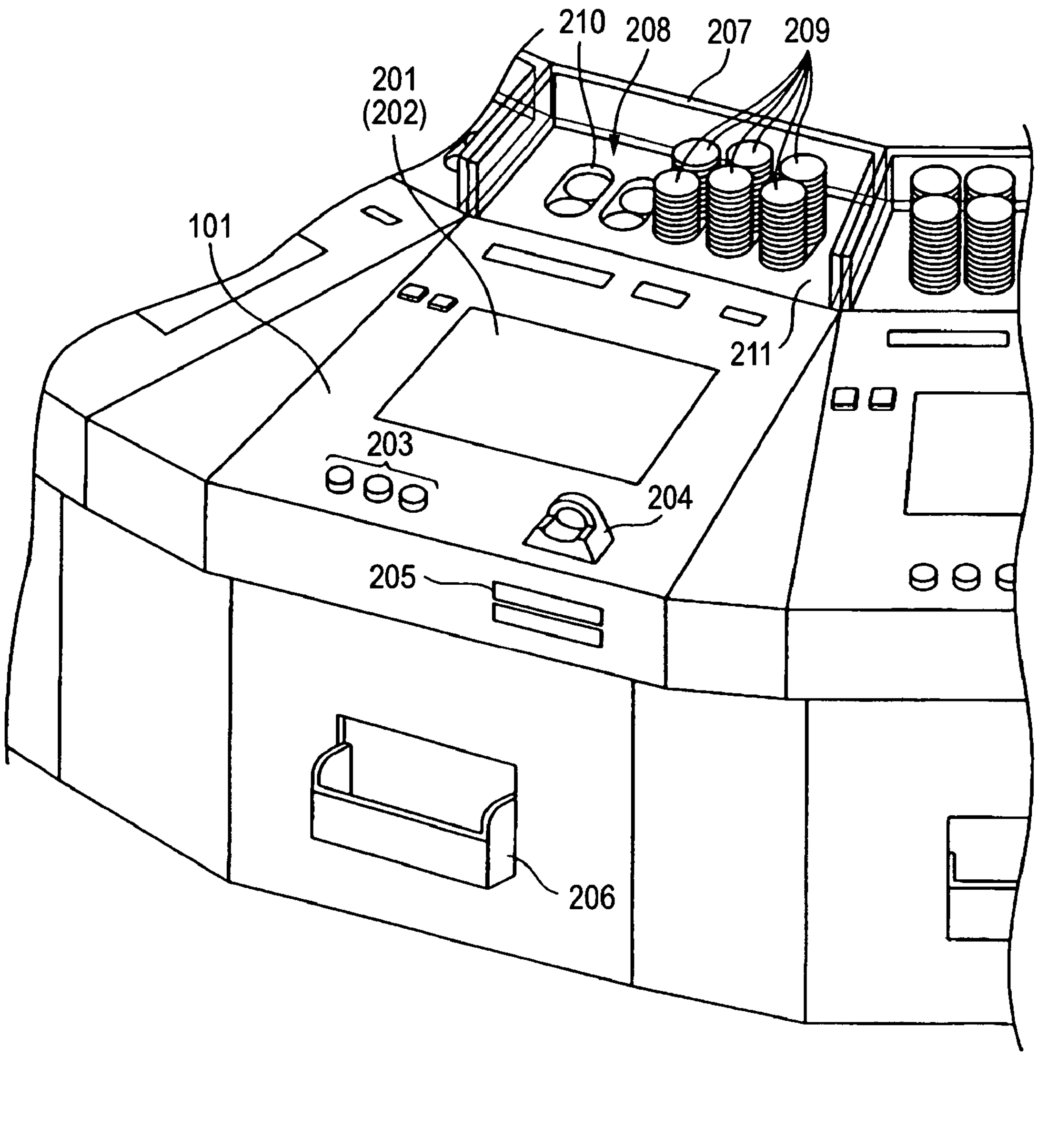
FIG. 2 is a perspective view of a player terminal.

FIG. 2 is an enlarged view of the player terminal 101. The player terminal 101 will be discussed with reference to FIG. 2. The player terminal 101 has a liquid crystal display 201 on the top for providing the player with information concerning a game. The liquid crystal display 201 is covered with a transparent touch panel 202 and displays an input interface screen, and a button group 203 of a plurality of buttons used by the player in a game, such as a PAYOUT button and a BET button, is placed in front of the liquid crystal display 201 for the player. A coin insertion section 204 for the player to input a game value medium such as a coin, a medal, or a chip (which will be hereinafter referred to simply as "coin") is provided on the right of the button group 203. A bill insertion section 205 for the player to input a bill is provided below the coin insertion section 204. A coin sensor (not shown in the figure) is placed in the coin insertion section 204 and when a coin is input into the coin insertion section 204, a coin detection signal is output through the coin sensor to the player terminal 101. A bill sensor (not shown in the figure) is placed in the bill insertion section 205 and when a bill is input into the bill insertion section 205, a bill detection signal is output through the bill sensor to the player terminal 101.

A coin payout opening 206 is provided at the bottom of the front of the player terminal 101. When the player presses the PAYOUT button of one button of the button group 203, as many coins as the number of coins corresponding to all or a part of the player-owned credit value stored in the player terminal 101 are ejected from the coin payout opening 206 and can be taken in a player's hand.

A transparent acrylic panel 207 is provided like an angular U shape on the side of the liquid crystal display 201 toward the panel section 103 and a solid model chip presentation section 208 is provided in the area surrounded by the transparent acrylic panel 207. The solid model chip presentation section 208 includes solid model chips 209, a presentation section plate 211 formed with openings 210 for projecting the solid model chips 209 from the inside of the player terminal 101 to the outside or storing the projected solid model chips 209 in the player terminal 101, and an elevating mechanism (described later) for moving up and down the solid model chips 209.

The solid model chip 209 is a model of a chip pile and is molded of a material such as a resin. One solid model chip presentation section 208 may have a plurality of solid model chips 209 different in units. For example, it may be provided with a solid model chip imitating a pile of chips with one credit point per chip, a solid model chip imitating a pile of chips with 10 credit points per chip, a solid model chip imitating a pile of chips with 100 credit points per chip, for example.

The solid model chips 209 are moved up and down by the elevating mechanism in response to the number of chips credited to the gaming machine 100 by the player operating the player terminal 101 provided with the solid model chip presentation section 208, namely, the credit value owned by the player. For example, now assuming that the credit value owned by the player is "251," the solid model chip imitating a pile of chips each with one credit point is moved up (down) so that it projects from the presentation section plate 211 by the height corresponding to the thickness of one chip, the solid model chip imitating a pile of chips each with 10 credit points is moved up (down) so that it projects from the presentation section plate 211 by the height corresponding to the thickness of five chips, and the solid model chip imitating a pile of chips each with 100 credit points is moved up (down) so that it projects from the presentation section plate 211 by the height corresponding to the thickness of two chips.

Every player can see the projection height of each solid model chip 209 from the presentation section plate 211, thereby grasping the credit value owned by the player rapidly and intuitively and enjoying a sense of realism as if actual chips were increased or decreased before player's eyes.

Figure 3:
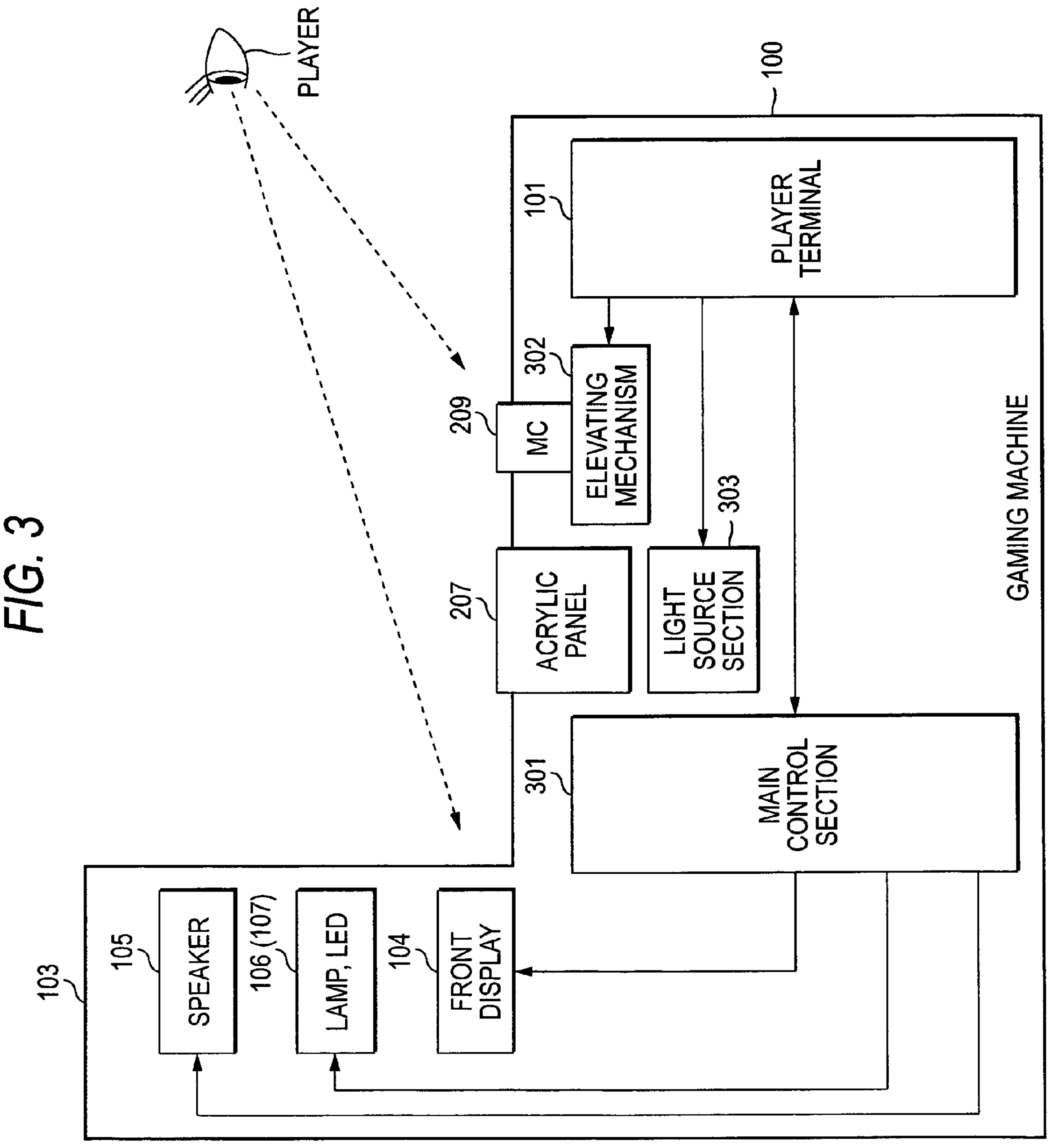
FIG. 3 is a block diagram to show a control system of the gaming machine.

FIG. 3 is a schematic block diagram to show an example of the internal structure of the gaming machine 100. The gaming machine 100 contains a main control section 301. The main control section 301 includes an information processor and peripheral units for executing a game program. The main control section 301 is connected to the player terminals 101, and bidirectionally communicates with the player terminals 101. The main control section 301 receives notification of player's selection such as the number of bet coins and the betting target from each player terminal 101 and if a predetermined condition is satisfied, starts execution of a game, determines a win or a loss of the game, and sends the result to each player terminal 101. Each player terminal 101 increases or decreases the credit value owned by the player in accordance with the notification from the main control section 301. For example, if the player wins the game, the corresponding player terminal 101 adds the credit value as much as the number of gained coins to the owned credit value in accordance with the notification from the main control section 301 and again stores the addition result; on the other hand, if the player loses the game, the corresponding player terminal 101 subtracts the credit value as much as the number of bet coins from the owned credit value in accordance with the notification from the main control section 301 and again stores the subtraction result.

The main control section 301 also outputs an image signal displayed on the front display 104 and performs drive control of the lamps 106, the LEDs 107, and the speakers 105.

An elevating mechanism 302 and a light source section 303 are connected to the player terminal 101.

The elevating mechanism 302 is means for moving up and down the solid model chips 209; in the embodiment, a stepping motor is used as moving up and down power, but a usual motor may be used in combination with a position control mechanism.

The specific configuration of the elevating mechanism 302 will be discussed with reference to FIG. 4.

Figure 4:
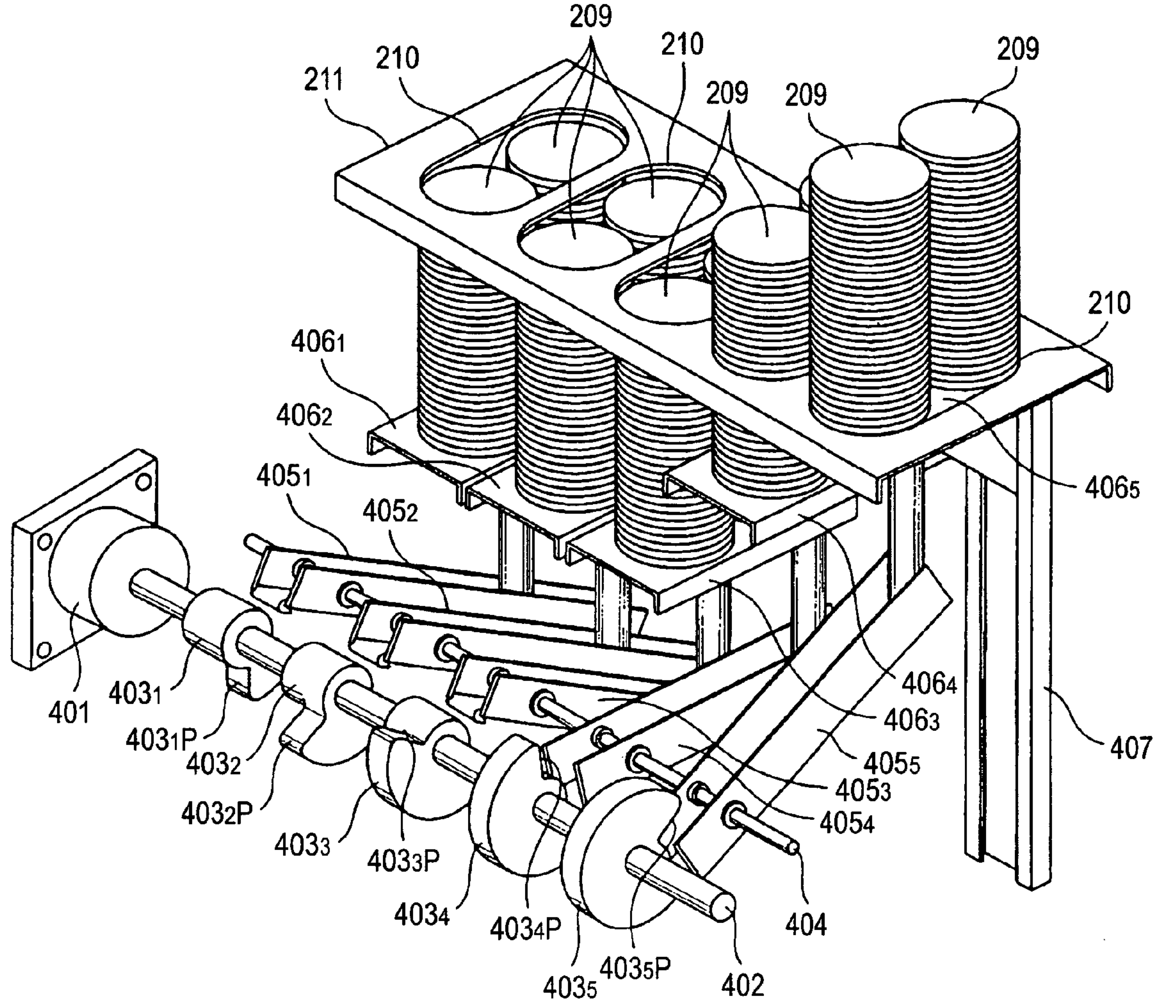
FIG. 4 is a perspective view to show an example of an elevating mechanism.

The elevating mechanism 302 shown in FIG. 4 has a rotation drive shaft 402 attached to a stepping motor 401, abutment members $403_1$ to $403_5$ fixed to the rotation drive shaft 402 and rotating with rotation of the rotation drive shaft 402, arm sections $405_1$ to $405_5$ attached for rotation by a support shaft 404 at positions where one ends abut abutment faces $403_1$P to $403_5$P of the abutment members $403_1$ to $403_5$, and table sections $406_1$ to $406_5$ attached to opposite ends of the arm sections $405_1$ to $405_5$. The solid model chips 209 are fixedly placed on the tops of the table sections $406_1$ to $406_5$. The table sections $406_1$ to $406_5$ are guided by a slide rail 407 and are regulated so as to allow the solid model chips 209 to pass through the openings 210.

In the example shown in FIG. 4, the five types of solid model chips 209 are moved up and down and the five abutment members $403_1$ to $403_5$, the five abutment faces $403_1$P to $403_5$P, the five arm sections $405_1$ to $405_5$, and the five table sections $406_1$ to $406_5$ are provided. To distinguish them from each other, subscript numbers are added in the description. In the description to follow, however, if it is not necessary to distinguish them from each other, no subscript numbers are added and they are simply written as the abutment member 403, the abutment face 403P, the arm section 405, and the table section 406.

Now, the operation of the elevating mechanism 302 shown in FIG. 4 will be described.

When the stepping motor 401 driven by the player terminal 101 rotates the rotation drive shaft 402, the abutment member 403 rotates. As the rotation advances, the abutment member 403 abuts one wend of the arm section 405. In the embodiment, the abutment face $\mathbf{403_5}$P abuts one end of the arm section $\mathbf{405_5}$ earliest and then the abutment face $\mathbf{403_4}$P, the abutment face $\mathbf{403_3}$P, the abutment face $\mathbf{403_2}$P, and the abutment face $\mathbf{403_1}$P abut one ends of the corresponding arm sections $\mathbf{405_1}$ to $\mathbf{405_4}$ in this order.

When the abutment member 403 further rotates after the abutment face 403P abuts one end of the arm section 405, the abutment face 403P pushes up one end of the arm section 405.

The arm section 405 pushed down at one end rotates on the support shaft 404 and is pushed upward at the opposite end. Consequently, the table section 406 fixed to the opposite end is also pushed upward and the solid model chip 209 placed on the table section 406 rises together. Consequently, it is made possible to allow a part or all of the solid model chip 209 to pass through the opening 210 in response to the rotation amount of the rotation drive shaft 402 by the stepping motor 401 for projecting and exposing the solid model chip 209 from the presentation section plate 211.

The stepping motor 401 is rotated backward, whereby a part or all of the solid model chip 209 once projected and exposed from the presentation section plate 211 can also be housed below the presentation section plate 211.

In the configuration example shown in FIG. 4, the shapes of the abutment members $\mathbf{403_1}$ to $\mathbf{403_5}$ are determined so that the timings at which the abutment faces $\mathbf{403_1}$P to $\mathbf{403_5}$P abut one ends of the corresponding arm sections $\mathbf{405_1}$ to $\mathbf{405_5}$ differ, so that the solid model chip 209 at the right end in the figure starts to rise earliest and then the remaining solid model chips 209 start to rise in the order of the right solid model chip 209 to the left solid model chip 209. Using this nature, if the colors and the patterns of the solid model chips are distinguished so that the value of the solid model chip 209 at the rightmost end per chip is made low (for example, one credit point per chip) and the value per chip is increased from the right to the left (five credit points, 10 credit points, 100 credit points, 1000 credit points), the owned credit value in a wide range of 1 to 100000 credit points, for example, can be represented by the projection amount of each solid model chip 209 from the presentation section plate 211.

Figure 5:
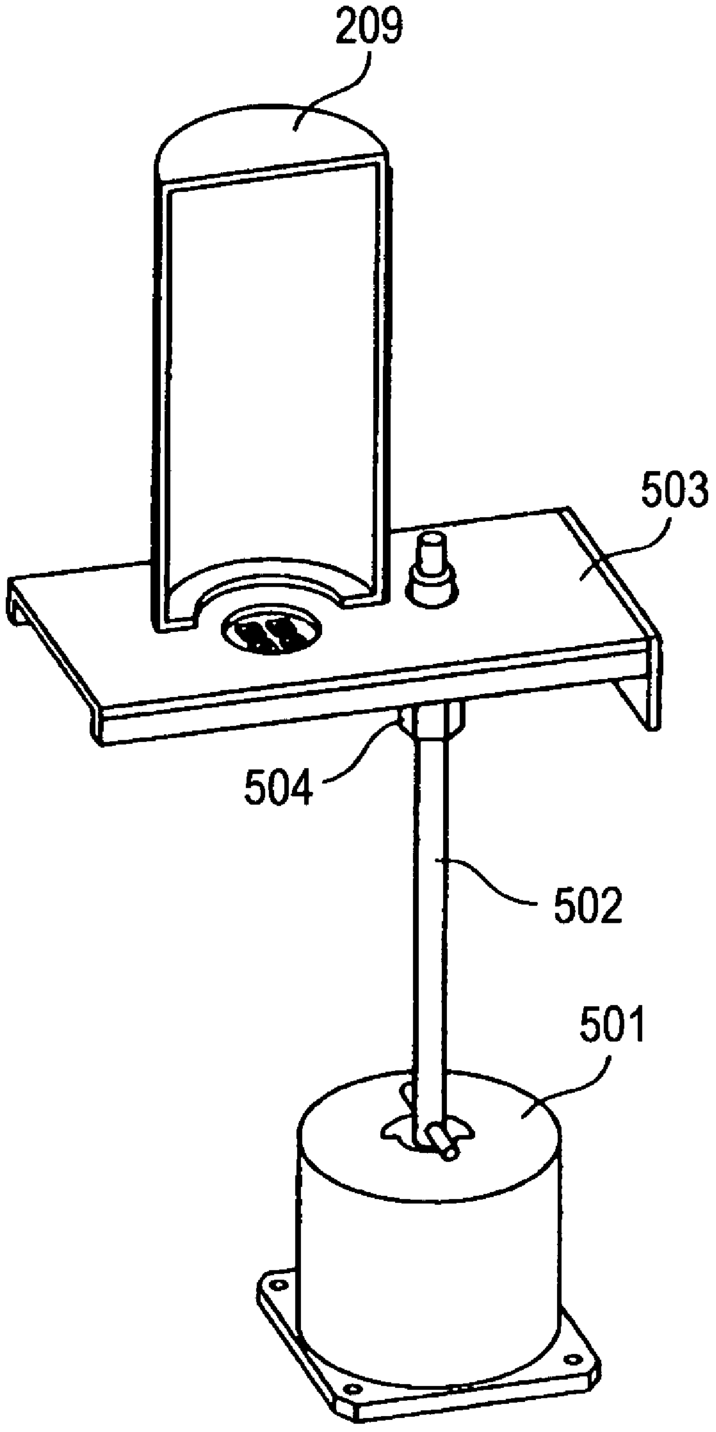
FIG. 5 is a perspective view to show a different example of the elevating mechanism.
Figure 6:
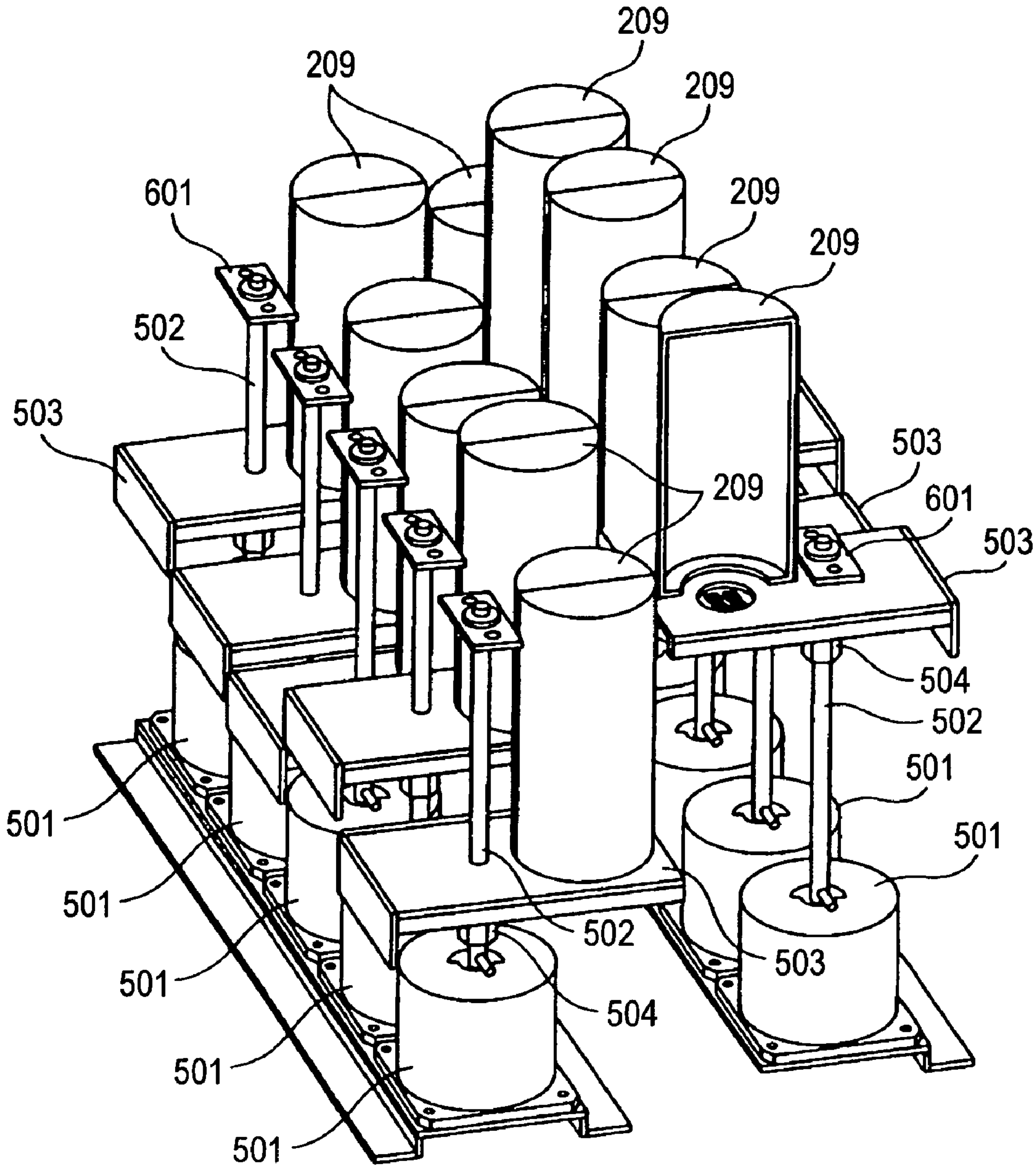
FIG. 6 is a perspective view to show the different example of the elevating mechanism.

Next, a different configuration example of the elevating mechanism 302 is shown in FIGS. 5 and 6. FIG. 5 is a perspective view of a basic unit in the different configuration example of the elevating mechanism 302. A plurality of the basic units are combined into one elevating mechanism 302.

The basic unit of the elevating mechanism 302 has a table section 503 attached to a rotation drive shaft 502 driven by a stepping motor 501.

A solid model chip 209 is placed on the top of the table section 503 as in the example described above. In FIG. 5, left and right hollow semicylinders are put together to form one solid model chip 209, and one hollow semicylinder before the two are put together is shown in the figure. Although not shown in the figure, the solid model chip 209 is moved up or down so as to project or retreat from the opening 210 of the presentation section plate 211 as in the example described above.

A nut 504 is fixedly secured to the bottom of the table section 503. The rotation drive shaft 502 is formed on the outer peripheral surface with screw thread and groove (not shown) and the nut 504 and the rotation drive shaft 502 are screwed together.

The table section 503 is regulated so as not to rotate with rotation of the rotation drive shaft 502. For example, a guide rail may be provided for regulating rotation of the table section 503 (not regulating a motion in an up and down direction) as in the example described above or the table section 503 may be abutted slidably against an inner wall, etc., of the gaming machine 100 for regulating rotation of the table section 503 (not regulating a motion in an up and down direction).

The rotation drive shaft 502 is rotated, whereby the table section 503 is advanced or retreated. That is, rotation drive of the stepping motor 501 is controlled, whereby moving up and down the table section 503, namely, the solid model chip 209 placed thereon can be controlled.

FIG. 6 is a perspective view to show an example wherein the elevating mechanism 302 is formed using a plurality of the basic units. In this example, the elevating mechanism 302 includes one row of five basic units each with one solid model chip 209 and another row of five basic units each with one solid model chip 209. Since the stepping motors 501 are provided in a one-to-one correspondence with the basic units, it is made possible to control moving up and down the solid model chip 209 separately for each basic unit.

Thus, to use the elevating mechanism 302 of such a configuration, in addition to use of the solid model chips 209 to display the owned credit value, it is also made possible to provide effect operation in such a manner that the solid model chips 209 are moved up and down like waves from the right to the left or from the left to the right if the player operating the player terminal obtains a large win, for example, as any other display.

Referring again to FIG. 3, the description of the schematic configuration of the gaming machine 100 is continued.

The player terminal 101 is connected to the light source section 303 and controls the light emission operation of the light source section 303. The light source section 303 is a circuit having a light emission source of a plurality of LEDs, etc., and function as a light source that can provide different colors (for example, red, blue, green, white, etc.,) and can be changed in luminance. Light emitted from the light source section 303 is guided by the acrylic panel 207 and is emitted to the outside of the gaming machine 100, most of all in the direction in which the light is visually recognized by the player.

2. Configuration Example of Main Control Section

Figure 7:
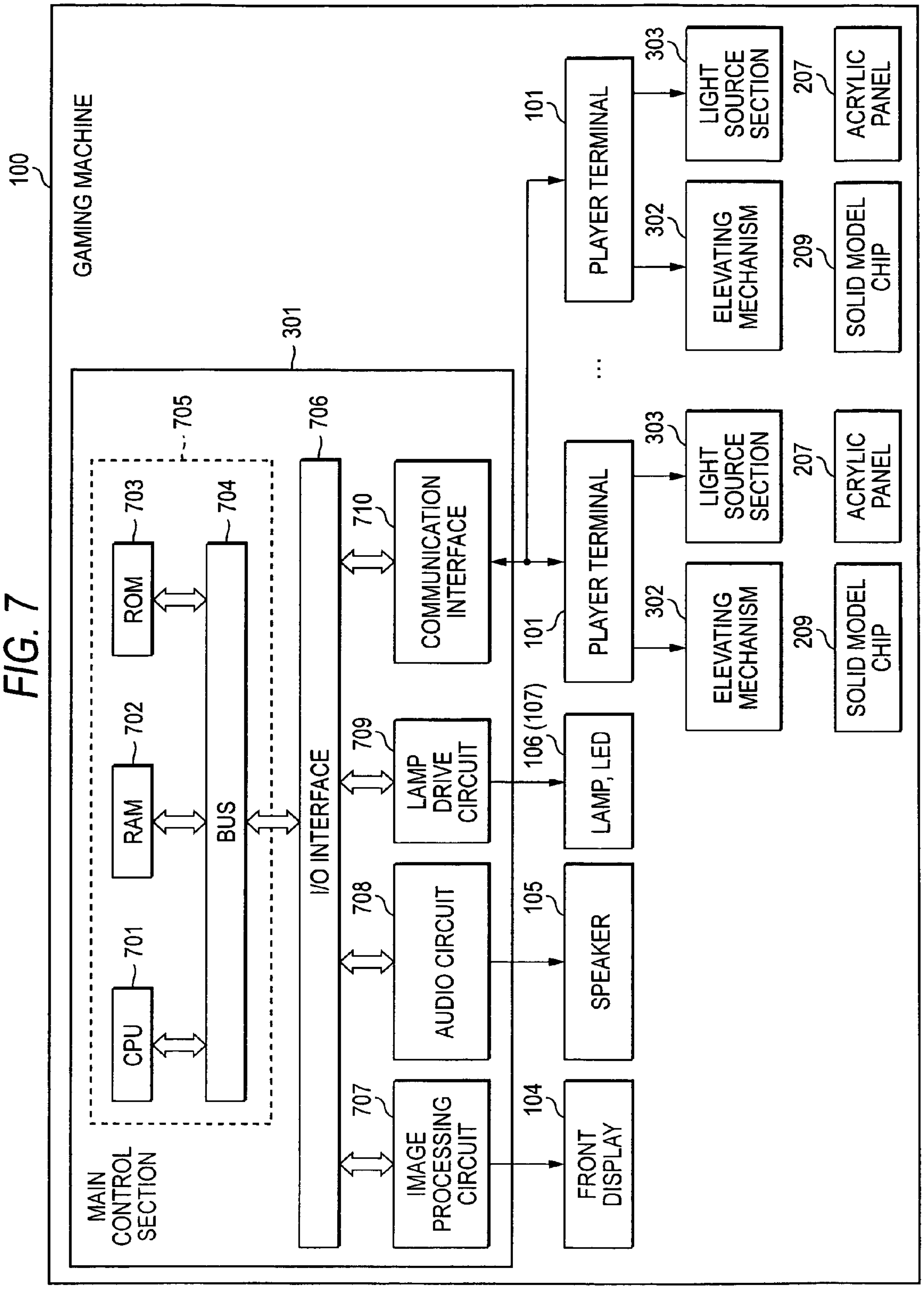
FIG. 7 is a functional block diagram to show a configuration example of a main control section.

Next, a configuration example of the main control section 301 will be discussed with reference to FIG. 7. FIG. 7 is a block diagram of the gaming machine 100 centering on the main control section 301.

The main control section 301 includes a microcomputer 705 having a CPU 701, RAM 702, ROM 703, and a bus 704 for executing data transfer among them, and the ROM 703 and the RAM 702 are connected to the CPU 701 through the bus 704. The ROM 703 stores various programs and data tables for performing processing required for control of the gaming machine 100. The RAM 702 is memory for temporarily storing various pieces of data on which the CPU 701 performed operations.

The microcomputer 705, more particularly, the CPU 701 is connected to an image processing circuit 707 through an I/O interface 706, and the image processing circuit 707 is connected to the front display 104 and controls driving the front display.

The image processing circuit 707 includes program ROM, image ROM, an image control CPU, work RAM, a VDP (video display processor), video RAM, and the like. The program ROM stores an image control program concerning display of the front display 104 and various selection tables. The image ROM stores dot data to form images, such as dot data to form an image on the front display 104, for example. The image control CPU determines the image to be displayed on the front display 104 from among the dot data pieces previously stored in the image ROM in accordance with the image control program previously stored in the program ROM based on a parameter set in the CPU 701. The work RAM is implemented as temporary storage means used when the image control CPU executes the image control program. The VDP generates image data responsive to the display determined by the image control CPU and outputs the image data to the front display 104. The video RAM is implemented as temporary storage means used when the VDP forms an image.

Further, the speakers 105 are connected to the microcomputer 705, more particularly, the CPU 701 through an audio circuit 708 and generates various effect sounds, background music, etc., when various effects are produced based on output signals from the audio circuit 708.

The lamps 106 and the LEDs 107 are connected to the microcomputer 705, more particularly, the CPU 701 through a lamp drive circuit 709. A large number of the lamps 106 and a large number of the LEDs 107 are disposed on the front of the gaming machine 100 and are controlled in lighting by the lamp drive circuit 709 based on a drive signal from the CPU 701.

The player terminals 101 are connected to the microcomputer 705, more particularly, the CPU 701 through a communication interface 710, so that the CPU 701 and the player terminals 101 can conduct bidirectional communications with each other. The CPU 701 can transmit and receive instructions and requests to and from the player terminals 101 through the communication interface 710, and the main control section 301 and the player terminals 101 perform game advance control in cooperation.

3. Configuration Example of Player Terminal

Figure 8:
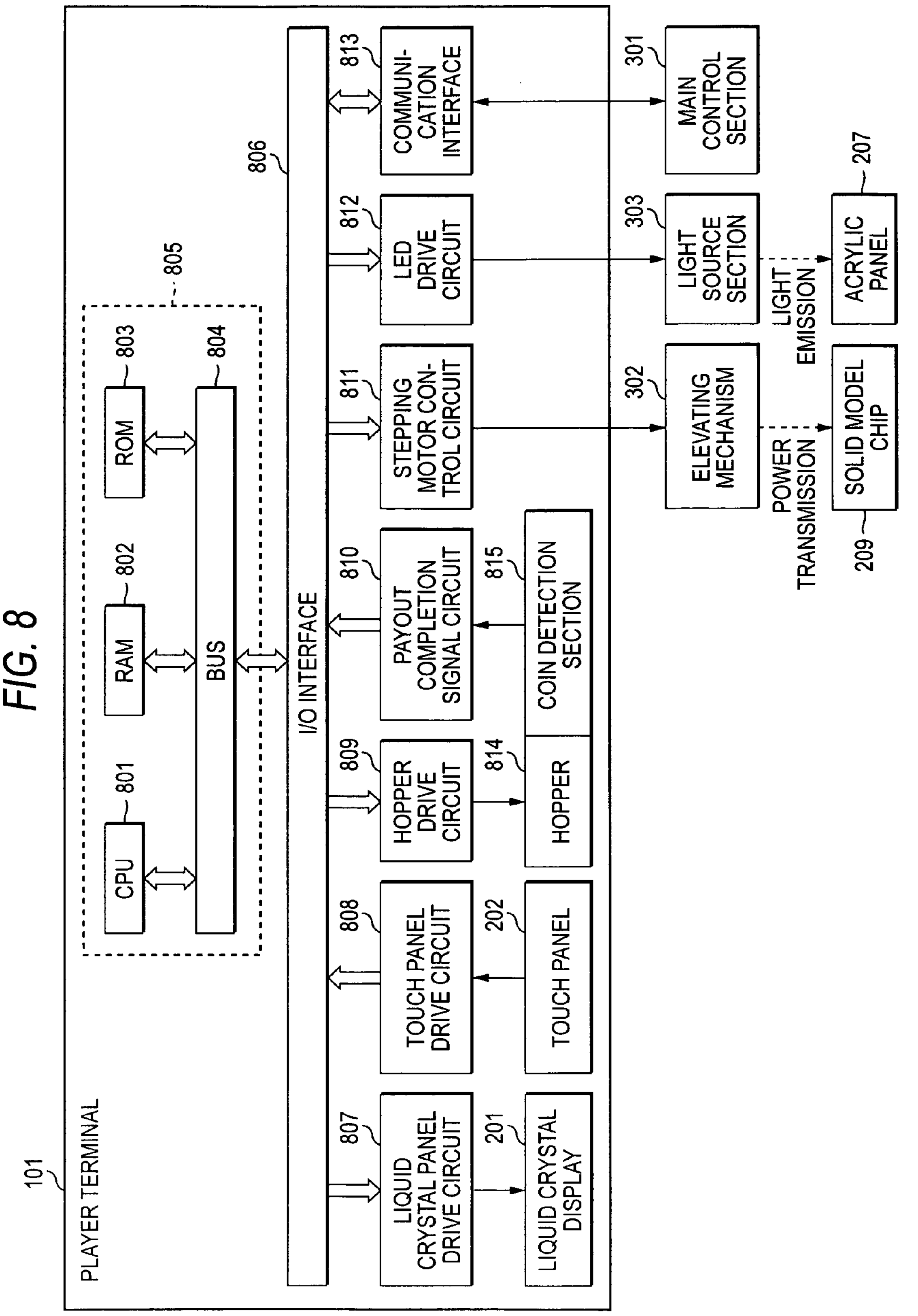
FIG. 8 is a functional block diagram to show a configuration example of the player terminal.

Next, a configuration example of the player terminal 101 will be discussed with reference to FIG. 8. FIG. 8 is a functional block diagram to show the control system of the player terminal 101.

The player terminal 101 basically has a microcomputer 805 as a nucleus made up of a CPU 801, RAM 802, ROM 803, and a bus 804 for executing data transfer among them, and the ROM 803 and the RAM 802 are connected to the CPU 801 through the bus 804. The ROM 803 stores various programs, data tables, etc., for performing processing required for control of the player terminal 101, for example, for performing operation control of the elevating mechanism 302, lighting and extinguishing control of the light source section, etc. The RAM 802 is memory for temporarily storing various pieces of data on which the CPU 801 performed operations.

The microcomputer 805, more particularly, the CPU 801 is connected to a liquid crystal panel drive circuit 807 through an I/O interface 806, and the liquid crystal panel drive circuit 807 is connected to the liquid crystal display 201 and controls driving the liquid crystal display 201.

The microcomputer 805, more particularly, the CPU 801 is connected to a touch panel drive circuit 808 through the I/O interface 806, and the touch panel drive circuit 808 outputs coordinate data of the touch position on the touch panel 202.

A hopper 814 is connected to the microcomputer 805, more particularly, the CPU 801 through a hopper drive circuit 809. When a drive signal is output from the CPU 801 to the hopper drive circuit 809, the hopper 814 pays out a predetermined number of coins from the coin payout opening 206. A coin detection unit 815 is connected to the CPU 801 through a payout completion signal circuit 810. The coin detection unit 815 is placed in the coin payout opening 206 and when detecting that a predetermined number of coins have been paid out from the coin payout opening 206, the coin detection unit 815 outputs a coin payout detection signal to the payout completion signal circuit 810, which then outputs a payout completion signal to the CPU 801.

The microcomputer 805, more particularly, the CPU 801 is connected to a motor control circuit 811 for rotating the stepping motor 401 (501) for driving the elevating mechanism 302. When a motor drive signal is output from the CPU 801 to the motor control circuit 811, the stepping motor 401 (501) is rotated by the motor control circuit 811. Accordingly, the elevating mechanism 302 operates to move up and down the solid model chips 209.

Further, the microcomputer 805, more particularly, the CPU 801 is connected to an LED drive circuit 812 for driving the light source section 303. In the embodiment, the light source section 303 includes a plurality of LEDs and the LED drive circuit 812 is responsive to an LED drive instruction from the CPU 801 for supplying drive power to the LEDs to which the LED drive instruction applies. Accordingly, lighting and extinguishing the LEDs can be controlled in any desired mode under the control of the CPU 801.

In the embodiment, the light source section 303 includes five red LEDs, five blue LEDs, and five white LEDs, and the LED drive circuit 812 is a circuit that can selectively supply power so as to separately light and extinguish the five red LEDs, the five blue LEDs, and the five white LEDs.

Further, the microcomputer 805, more particularly, the CPU 801 is connected to the main control section 301 through a communication interface 813, so that the CPU 801 and the main control section 301 can conduct bidirectional communications with each other. The CPU 801 can transmit and receive instructions, requests, data, etc., to and from the main control section 301, and the main control section 301 and the player terminal 101 perform game advance control in cooperation.

Figure 9:
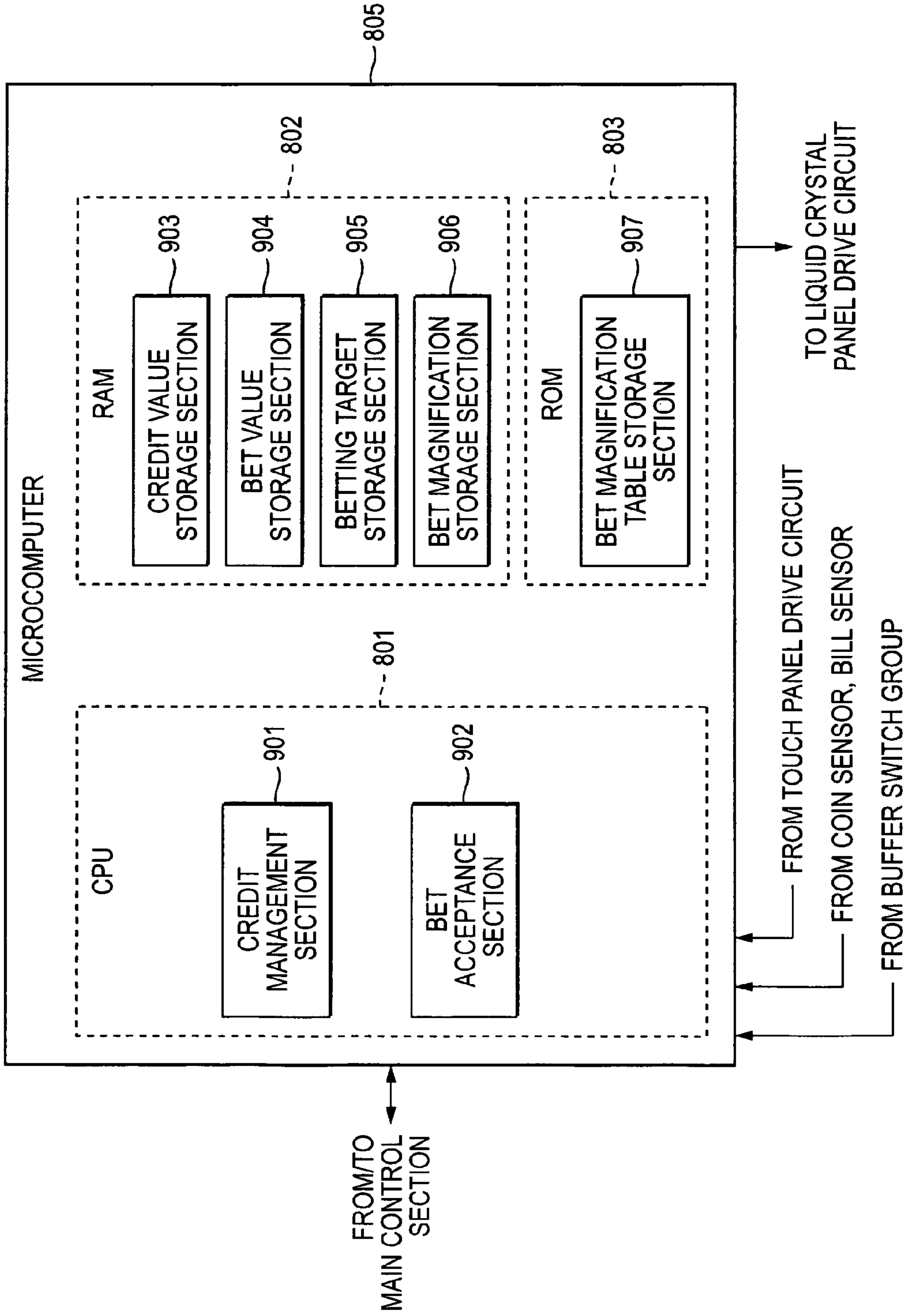
FIG. 9 is a functional block diagram of a microcomputer of the player terminal.

FIG. 9 is a block diagram to describe the function of the microcomputer 805 of the player terminal 101 and is a functional block diagram mainly concerning display processing.

The microcomputer 805 has a credit management section 901, a bet acceptance section 902, a credit value storage section 903, a bet value storage section 904, a betting target storage section 905, a bet magnification storage section 906, and a bet magnification table storage section 907.

The credit management section 901 and the bet acceptance section 902 are mainly implemented as the CPU 801, the credit value storage section 903, the bet value storage section 904, the betting target storage section 905, and the bet magnification storage section 906 are mainly implemented as the RAM 802, and the bet magnification table storage section 907 is mainly implemented as the ROM 803.

The credit management section 901 has a function of increasing and decreasing the credit value stored in the credit value storage section 903 in response to the game progress. That is, the credit management section 901 increases the credit value stored in the credit value storage section 903 in response to a detection signal from the coin sensor or the bill sensor and subtracts the bet value used by the player for the game from the credit value stored in the credit value storage-section 903 and if the player wins the game and obtains an award, adds the award reported from the main control section 301 to the credit value stored in the credit value storage section 903.

The bet acceptance section 902 has a function of accepting input concerning a bet of the player, generates bet information for sending the description of the bet to the main control section 301 based on the input, and transmitting the bet information to the main control section 301.

The player operates the button group 203 and/or the touch panel 202 to execute input concerning a bet as specification of the betting target (in the example, "Tie," "Player," or "Banker") and specification of the bet value (value of credit bet on the betting target). The bet information described above contains information specifying the betting target and information specifying the bet value.

The bet acceptance section 902 further has a function of determining the bet magnification in response to the amount of the bet value. The bet magnification is a magnification for determining the award to be paid out to the player if the player wins the game relative to the betting target. The award to be paid out to the player becomes the value provided by multiplying the bet value by the bet magnification.

The credit value storage section 903 has a function of storing the credit value. The credit value is increased or decreased by the credit management section 901 so as to always cover the most recent game situation, and is stored in the credit value storage section 903.

The bet value storage section 904 stores the bet value specified by the player operating the button group 203 and/or the touch panel 202. When accepting specification input of the bet value from the player, the bet acceptance section 902 stores the bet value in the bet value storage section 904. When the game is over, the bet value stored in the bet value storage section 904 is cleared and the player terminal waits for writing the bet value input in a new game.

The betting target storage section 905 stores information for specifying the betting target specified by the player operating the button group 203 and/or the touch panel 202 (for example, ID, code, etc.,). When accepting specification input of the betting target from the player, the bet acceptance section 902 stores information for specifying the betting target in the betting target storage section 905. When the game is over, the information for specifying the betting target stored in the betting target storage section 905 is cleared and the player terminal waits for writing information for specifying the betting target input in a new game.

The bet magnification storage section 906 stores the bet magnification determined by the bet acceptance section 902 referencing the credit value storage section 903 and the bet magnification table storage section 907 described later. When the game is over, the bet magnification stored in the bet magnification storage section 906 is cleared and the player terminal waits for writing the bet magnification determined by the bet acceptance section 902 in a new game.

The bet magnification table storage section 907 has a function of storing a bet magnification table of information for the bet acceptance section 902 to determine the bet magnification responsive to the bet value. FIG. 10 is a drawing to show a data structure example of a bet magnification table stored in the bet magnification table storage section 907. A bet magnification table 1000 stores the bet magnification for each betting target and stores normal bet magnifications (first bet magnifications) applied in a normal case and higher bet magnifications (second bet magnifications) applied if the bet value matches a predetermined value.

Assuming that the predetermined value is "100", for example, when the betting target is "Tie" and the bet value is 90, the bet acceptance section 902 references the bet magnification table 1000 and acquires usual bet magnification "9." Likewise, when the betting target is "Tie" and the bet value is the predetermined value 100, the bet acceptance section 902 references the bet magnification table 1000 and acquires higher bet magnification "18."

Thus, the bet magnification table storage section 907 is referenced and is used for the bet acceptance section 902 to determine the bet magnification.

4. Operation Example

Figure 11:
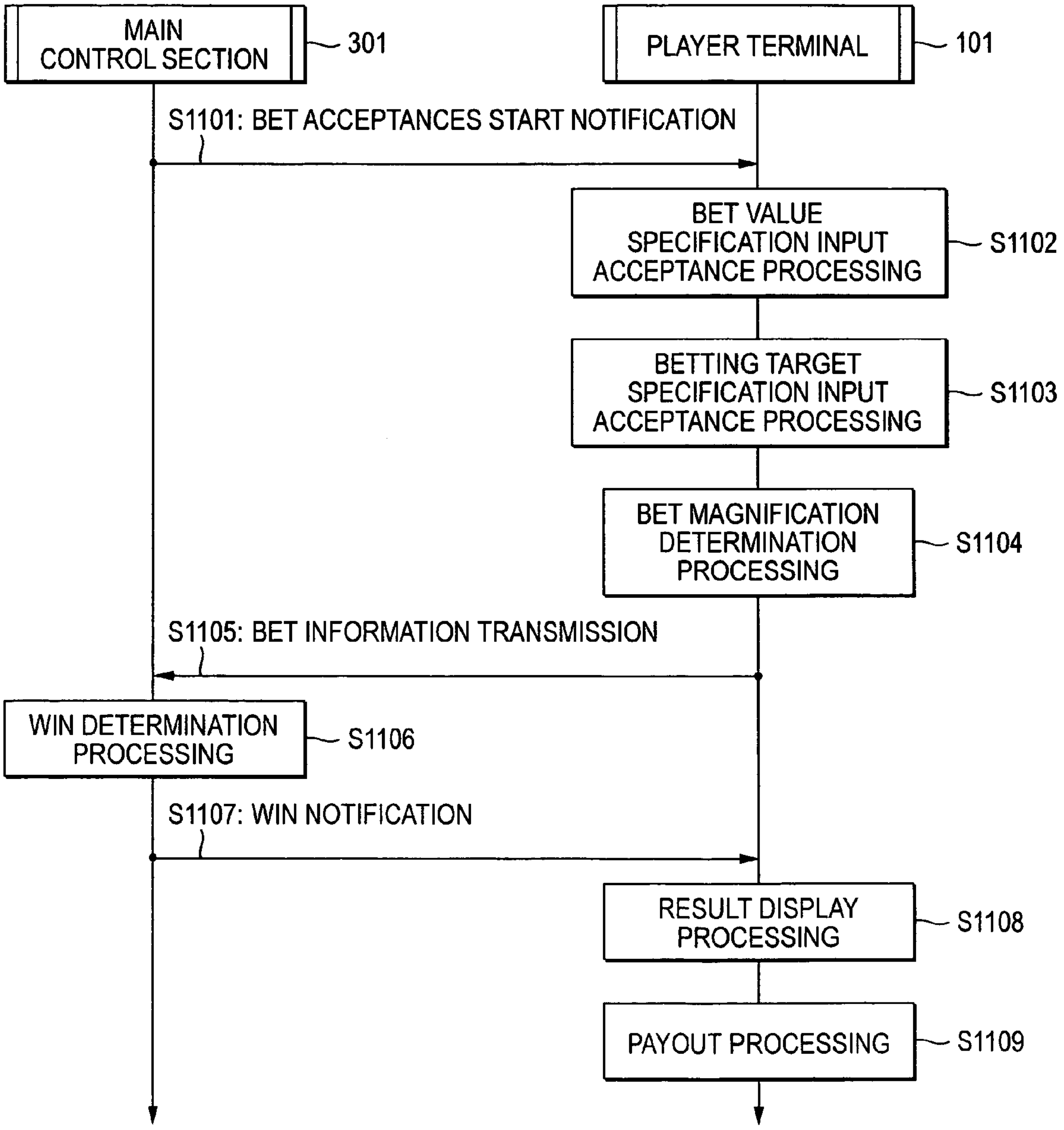
FIG. 11 is a sequence chart to show an operation example of the gaming machine.

Next, an operation example of the gaming machine 100 will be discussed with reference to FIG. 11. FIG. 11 is a sequence chart to show an operation example of the gaming machine. FIG. 11 shows only one player terminal 101 as representative. Since similar operation is also performed in other player terminals 101, processing of other player terminals is not shown in FIG. 11. The sequence chart of FIG. 11 shows the operation in the gaming machine 100 from start of a game to determination of a win or a loss of the game to payout of an award. That is, whenever one game is executed, the operation shown in FIG. 11 is repeated.

To begin with, when the main control section 301 determines game start, it sends a bet acceptance start notification to the player terminal 101 (step S1101).

Upon reception of the bet acceptance start notification, the player terminal 101, more particularly, the CPU 801 or the bet acceptance section 902 executes bet value specification input acceptance processing (step S1102). In the processing, the player is prompted to enter specification of the bet value and when the player enters specification of the bet value, the specified bet value is stored in the bet value storage section 904.

Next, the player terminal 101, more particularly, the CPU 801 or the bet acceptance section 902 executes betting target specification input acceptance processing (step S1103). In the processing, the player is prompted to enter specification of the betting target and when the player enters specification of the betting target, information for specifying the specified betting target is stored in the betting target storage section 905.

Figure 12:
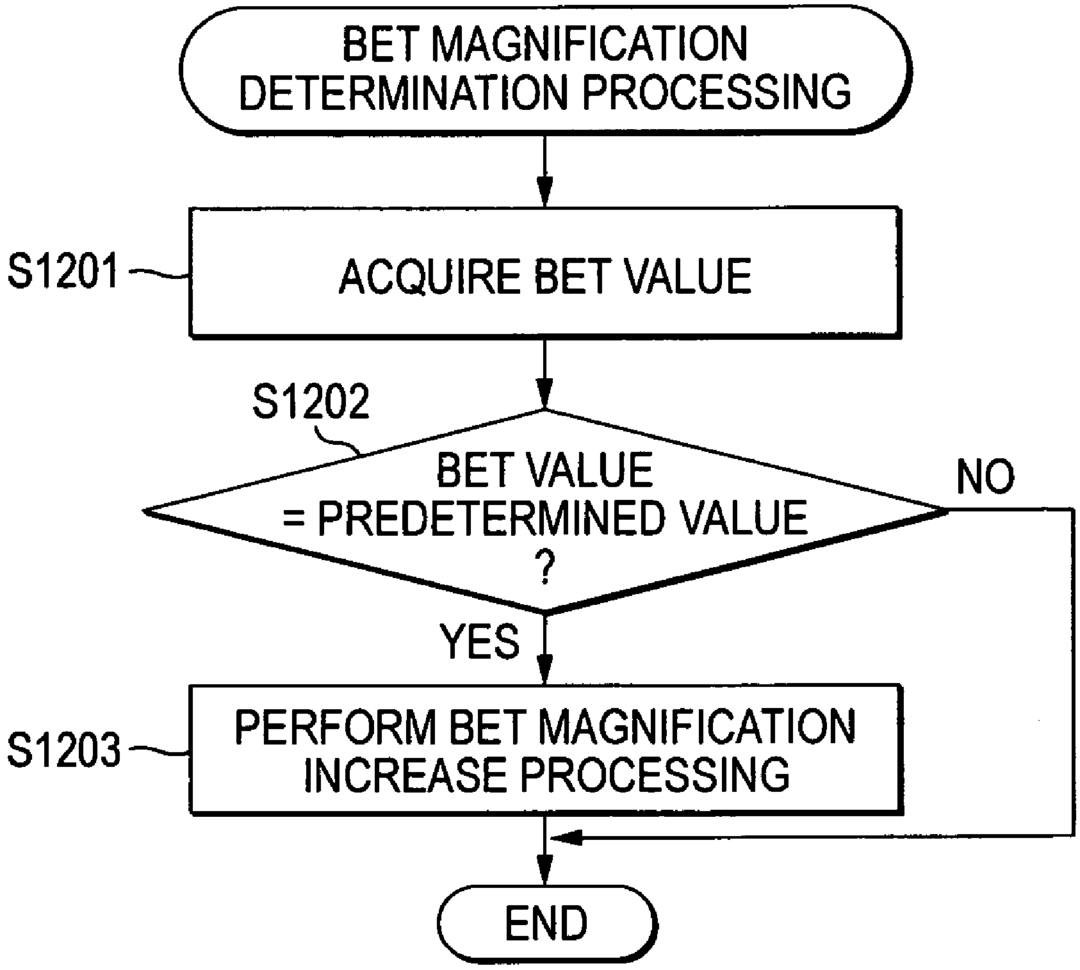
FIG. 12 is a flowchart to show an example of bet magnification determination processing.

Next, the player terminal 101, more particularly, the CPU 801 or the bet acceptance section 902 executes bet magnification determination processing (step S1104). This processing is processing of determining the bet magnification in response to the bet value specified in the previous bet value specification input acceptance processing. FIG. 12 is a flowchart to show an example of the bet magnification determination processing. When starting the bet magnification determination processing, the player terminal 101, more particularly, the CPU 801 or the bet acceptance section 902 acquires the bet value from the bet value storage section 904 (step S1201). Next, the player terminal 101, more particularly, the CPU 801 or the bet acceptance section 902 makes a comparison between the acquired bet value and a predetermined value to determine whether or not the bet value equals the predetermined value (step S1202). If the player terminal 101, more particularly, the CPU 801 or the bet acceptance section 902 does not determine that the bet value equals the predetermined value (NO at step S1202), it does not increase the bet magnification, in other words, selects the usual bet magnification and terminates the bet magnification determination processing. On the other hand, if the player terminal 101, more particularly, the CPU 801 or the bet acceptance section 902 determines that the bet value equals the predetermined value (YES at step S1202), it performs bet magnification increase processing (step S1203). In the example, as the bet magnification increase processing, the player terminal 101, more particularly, the CPU 801 or the bet acceptance section 902 acquires the corresponding higher bet magnification from the bet magnification table 1000. The bet magnification is set in the bet magnification table 1000 so as to become a larger value than the usual bet magnification described above. After the termination of the bet magnification increase processing, the player terminal 101, more particularly, the CPU 801 or the bet acceptance section 902 terminates the bet magnification determination processing.

Referring again to FIG. 11, the description of the operation example of the gaming machine 100 is continued.

After the termination of the bet magnification determination processing (step S1104), the player terminal 101, more particularly, the CPU 801 or the bet acceptance section 902 generates bet information and transmits the bet information to the main control section 301 (step S1105). The bet information contains the bet value specified in the bet value specification input acceptance processing (step S1102), the information for specifying the betting target specified in the betting target specification input acceptance processing (step S1103), and the bet magnification determined in the bet magnification determination processing (step S1104). If a plurality of player terminals 101 exist, information for identifying the player terminal 101 of the transmitting party may be further contained in the bet information.

Upon reception of the bet information, the main control section 301 executes win determination processing (step S1106). The win determination processing is processing of advancing the game and determining a win or a loss of each player joining the game.

When a win or a loss is determined in the win determination processing, the main control section 301 sends a notification of a win or a loss to the player terminal 101 (step S1107). The notification contains information concerning a win or a loss about the player of the player terminal 101 and award information in a case where the player wins the game. The award is a value calculated by the main control section 301 according to the bet value and the bet magnification contained in the bet information.

Upon reception of the win notification, the player terminal 101 executes result display processing (step S1108). This result display processing is processing of displaying a message, etc., indicting a win or a loss, such as "Win" or "Loss," on the liquid crystal display 201 of the player terminal 101.

Next, the player terminal 101 executes payout processing (step S1109). If an award is indicated in the previous win notification (step S1107), the payout processing is processing of adding the award to the credit value. Accordingly, the player receives the award based on the bet magnification responsive to the bet value.

5. Screen Examples

Next, screen examples of the gaming machine 100 will be discussed.

Figure 13:
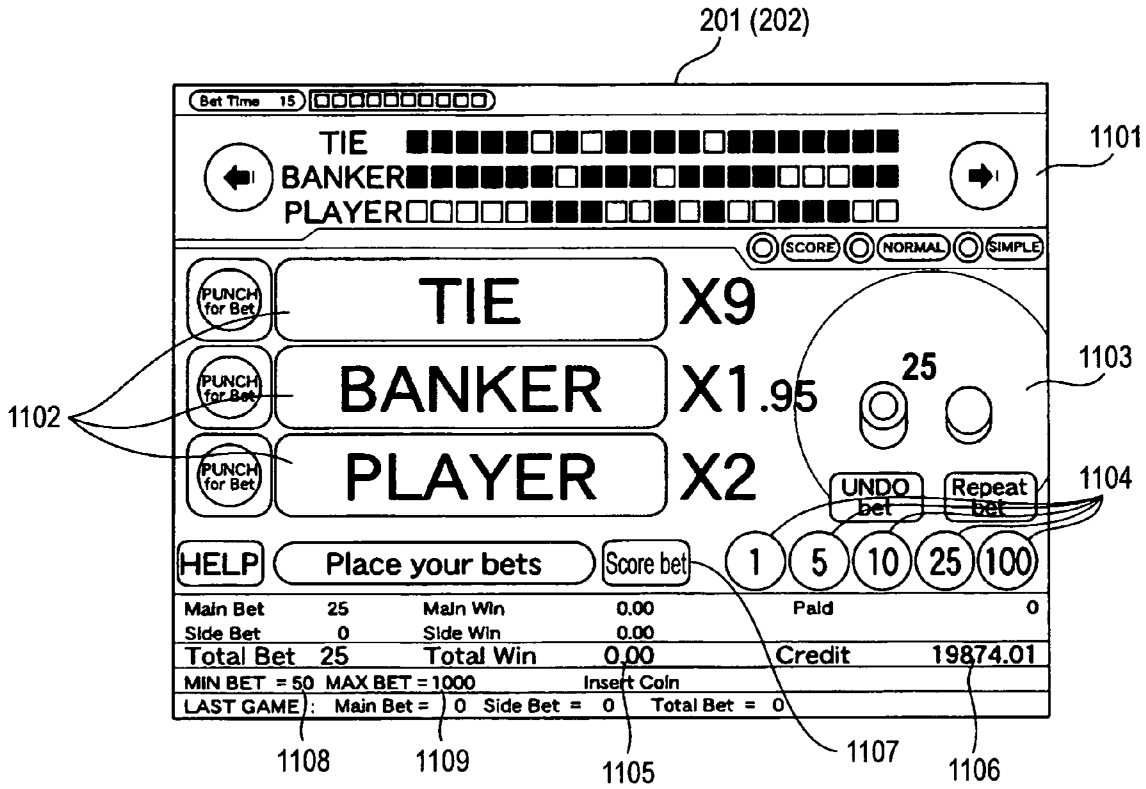
FIG. 13 is a drawing to show an example of a bet screen displayed on a liquid crystal display of the player terminal.

FIG. 13 shows an example of a bet screen displayed on the liquid crystal display 201 of the player terminal 101. The bet screen functions as abet input interface for prompting the player to bet for the bet value specification input acceptance processing (step S1102) and the betting target specification input acceptance processing (step S1103) previously described. Each player uses the bet screen shown in FIG. 13 as an input interface and touches the touch panel 202 provided on the front of the liquid crystal display 201, thereby performing operation to advance a game.

A win occurrence table area 1101 is generated in the upper part of the screen. This win occurrence table area 1101 is an area for indicating which occurred (which of "Tie," "Player," and "Banker" the game result was) in the past games. It is made possible for the player to predict win occurrence betting target in the next game by seeing the description in the area 1101.

Area buttons 1102 corresponding to the three types of bet betting targets "Tie," "Player," and "Banker" are displayed on the left below the win occurrence table area 1101. The player can select the betting target by touching any one of the three area buttons 1102.

The bet magnifications are displayed on the right of the area buttons 1102. If the game result matches the betting target selected by the player, namely, if the player wins the game, the player obtains the gained credit value corresponding to the value resulting from multiplying the game value (the number of coins) bet by the player on the game by the bet magnification.

A chip display area 1103 is provided on the right of the bet magnifications. A chip image corresponding to the game value (the number of coins) bet by the player on the game is displayed in the chip display area 1103 for producing effect for augmenting the realism.

A plurality of bet buttons 1104 are displayed below the chip display area 1103. The player can enter any desired bet value by appropriately touching any of the bet buttons 1104. In the example shown in the figure, values of "1," "5," "10," "25," and "100" are set in the bet buttons 1104, and the game value (the number of coins) responsive to the value set by one touch is added to the bet value.

A gained credit value display area 1105 and an owned credit value display area 1106 are provided below the bet buttons 1104.

A score bet button 1107 for switching the bet mode to a score bet mode is displayed on the left of the bet buttons 1104. When the player touches the score bet button 1107, the bet screen switches to the screen corresponding to the score bet mode.

A bet amount lower limit display area 1108 and a bet amount upper limit display area 1108 in the score bet mode are included slantingly below the left of the score bet button 1107, displaying the bet amount lower limit and the bet amount upper limit and requesting the player to determine the bet amount in the range of the lower limit to the upper limit.

Next, an example of a bet input method will be discussed with reference to FIGS. 14A-15B.

Figure 14B:
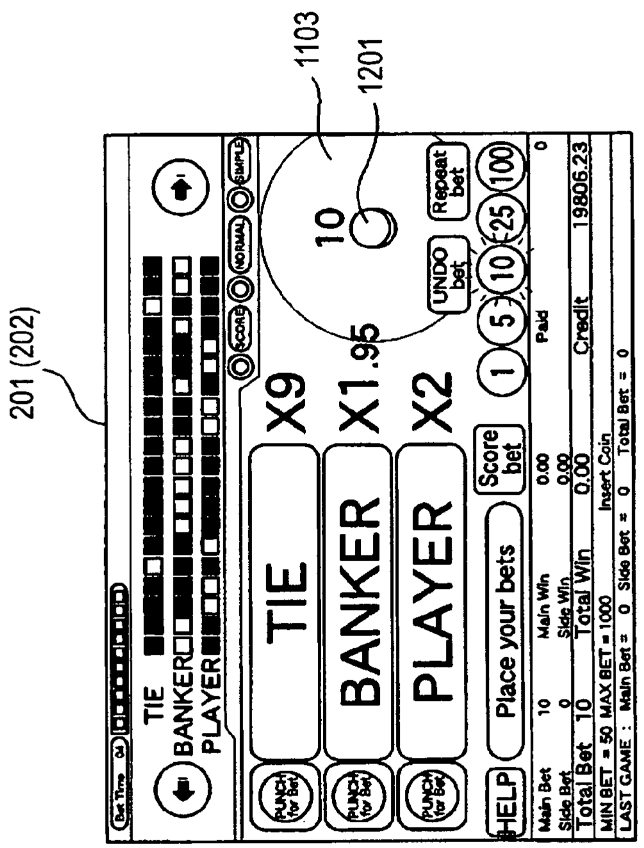
FIG. 14B is a drawing to show an example of the bet screen displayed after the state shown in FIG. 14A.
Figure 14A:
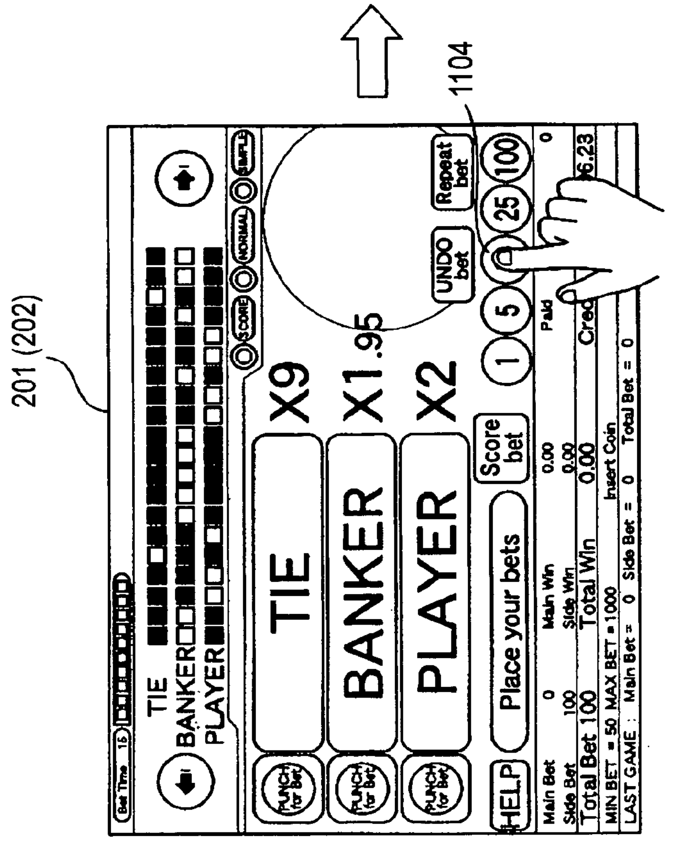
FIG. 14A is a drawing to show an example of the bet screen displayed on the liquid crystal display of the player terminal.

FIG. 14A shows a state in which the player touches the bet button 1104 to determine the bet amount after the bet screen shown in FIG. 13 is displayed.

FIG. 14B shows a bet screen example displayed to which a transition is made from the screen in FIG. 14A. A chip image 1201 responsive to the bet amount corresponding to the bet button 1104 touched by the player is displayed in the chip display area 1103, making the player recognize the bet amount.

Figures 15A, 15B:
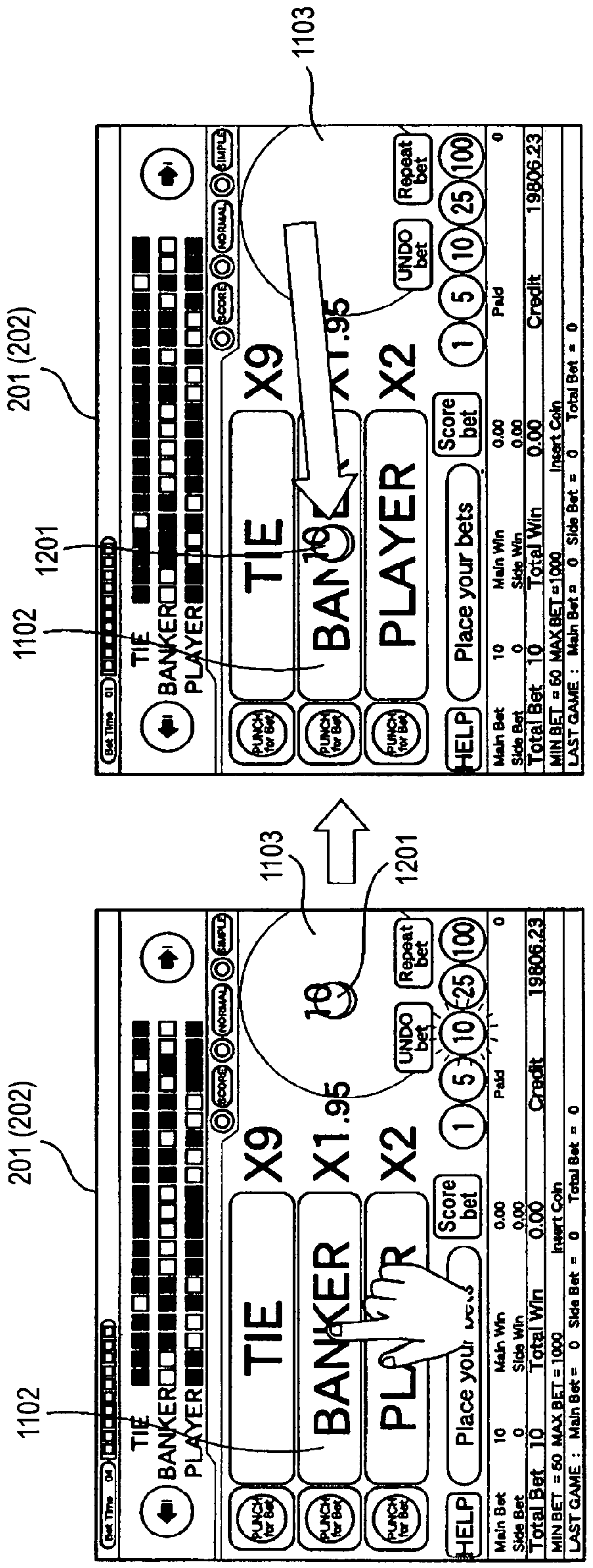
FIG. 15A is a drawing to show an example of the bet screen displayed after the state shown in FIG. 14B.
FIG. 15B is a drawing to show an example of the bet screen displayed after the state shown in FIG. 15A.

FIG. 15A shows a state in which the player touches the area button 1102 to determine the betting target after the bet screen shown in FIG. 14B is displayed.

FIG. 15B shows a bet screen example displayed to which a transition is made from the screen in FIG. 15A. The screen displays an image as if the chip image 1201 moved from within the chip display area 1103 to the area button 1102 touched by the player, making the player recognize the betting target.

The bet input is now complete. After this, when the main control section 301 determines the game result and sends a notification of the game result, the screen switches to a game result notification screen (not shown), notifying the player of an award or collection of the bet amount.

Figure 16:
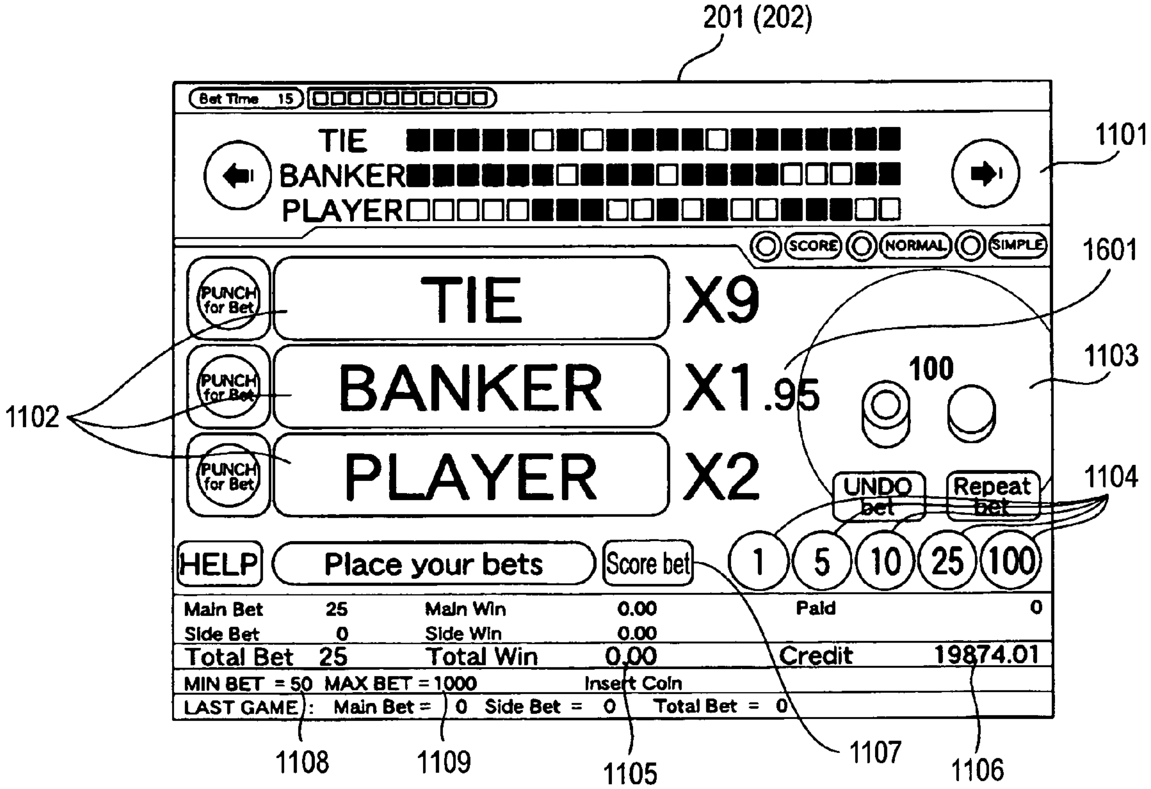
FIG. 16 is a drawing to show an example of the bet screen displayed on the liquid crystal display of the player terminal when the bet magnification is increased.

Next, a screen example when bet magnification increase is executed in bet magnification determination processing will be discussed with reference to FIGS. 16-17B. FIG. 16 shows a screen example in a state in which the player completes input with the bet value set to 100. Since the bet value is the predetermined value 100 or more, the player terminal 101 executes bet magnification change processing, thereby changing the bet magnification from the normal magnification to the increment magnification. In the example, however, the magnification is not displayed on the screen until the betting target is determined. Thus, a bet magnification display image 1601 displayed on the liquid crystal display 201 remains in the normal magnification.

Figure 17B:
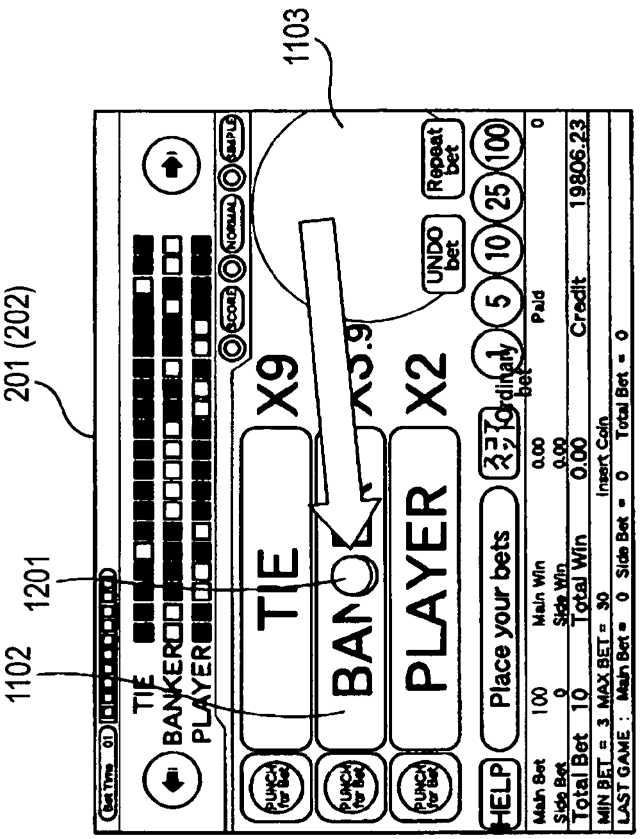
FIG. 17B is a drawing to show an example of the bet screen displayed after the state shown in FIG. 17A.
Figure 17A:
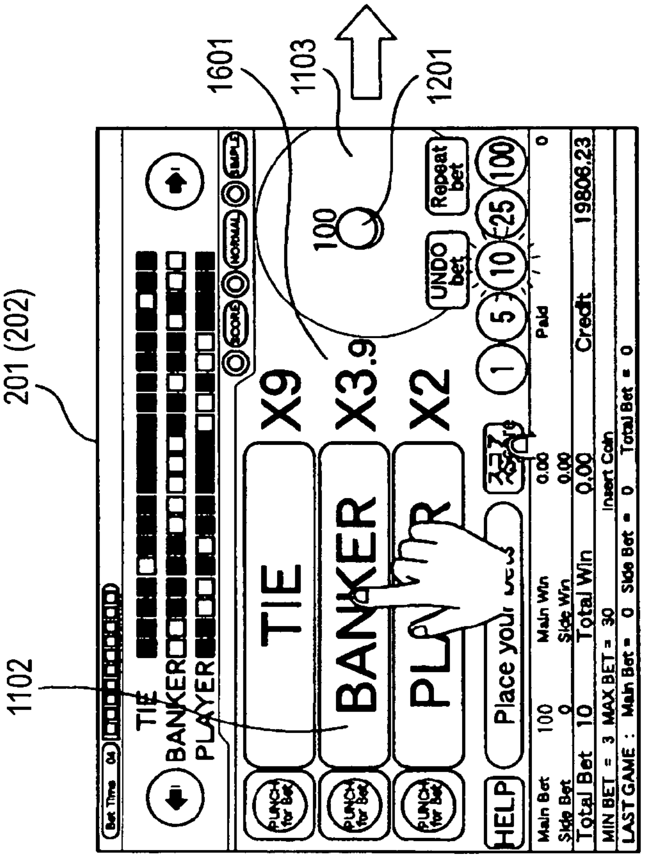
FIG. 17A is a drawing to show a screen example displayed after the bet screen displayed in FIG. 16.

FIG. 17A shows a state in which the player touches the area button 1102 to determine the betting target after the bet screen shown in FIG. 16 is displayed. In this example, the player selects "BANKER" as the betting target. At this time, the bet magnification display image 1601 corresponding to the betting target "BANKER" is changed from the previous "1.95" to the increment magnification "3.9." Accordingly, the player knows that the bet magnification is increased.

FIG. 17B shows a bet screen example displayed to which a transition is made from the screen in FIG. 17A. The screen displays an image as if the chip image 1201 moved from within the chip display area 1103 to the area button 1102 touched by the player, making the player recognize the betting target. Consequently, the player bets 100 credit points on "BANKER" and can recognize that the bet magnification is the increment magnification "3.9."

6. Modified Examples

The following modified examples of the embodiment are also possible:

(1) The bet magnification change (bet magnification determination processing) may be performed only for predetermined bet betting targets. For example, one or more bet betting targets whose bet magnification can be changed may be determined by lottery at the game start time and the bet magnification determination processing may be performed only if the player specifies the betting target.

(2) The bet magnification change (bet magnification determination processing) may be executed only if a predetermined time condition is satisfied. For example, as the predetermined condition, the bet magnification determination processing may be performed only if the player bets at a predetermined point in time. As the predetermined point in time, for example, a bet value is entered at the expiration of a predetermined time interval since bet acceptance start.

(3) The predetermined value in the bet magnification determination processing may be determined for each betting target. The number of predetermined values need not necessarily be one; two or more values may be predetermined and if any of the predetermined values and the bet value equal, the increment bet value may be selected. As the predetermined value, a range of the predetermined values may be specified. The predetermined value need not always be unchanged and may be changed as required. For example, the predetermined value may be determined at random using a random number, etc., each time a game is started.

In the above described embodiment, the microcomputer 705, the CPU 701, or the bet acceptance section 902 serves as an acceptance means for accepting input specifying the game value bet on the game. The microcomputer 705, the CPU 701, or the bet magnification table storage section 907 serves as a magnification storage means for storing a normal magnification to determine the award and a higher magnification to determine the award, the higher magnification being configured to be larger than the normal magnification. The microcomputer 705, the CPU 701, or the bet acceptance section 902 serves as a magnification determination means for selecting one of the normal magnification and the higher magnification based on the game value accepted by the acceptance means. The microcomputer 705, the CPU 701, or the bet acceptance section 902 serves as a betting target specification acceptance means for requesting the player to select at least one from betting targets on which the game value is to be bet.

In the above described embodiment, the liquid crystal display 201 of the player terminals 101 and the front display 104 serves as a display. The transparent touch panel 202 and the button group 203 of the player terminals 101 and the bet acceptance section 902 serve as an operation unit that allows a player to input operations. The main control section 301 including the microcomputer 705 serves as a controller that performs game process for providing a game to the player by displaying a progress of the game on the display in accordance with the operations input through the operation unit. The RAM 802 and the ROM 803 including the bet magnification table storage section 907 serve as a storage that stores information indicating a first magnification and a second magnification that is larger than the first magnification.

According to the gaming machine 100, the player feels like playing a game or a gambling while determining the amount of game value to be bet. Accordingly, the gaming machine 100 can provide larger excitement to the player while providing a traditional game such as baccarat.

According to the modification as described in item (2) in the above, a game property or a gamble property can be given to determining the game value to be bet, so that it is made possible to provide a furthermore excitable game for the player.

According to the modification as described in item (3) in the above, a game property or a gamble property can be given to determining the bet execution timing, so that it is made possible to provide a furthermore excitable game for the player.

According to the invention, there can be provided a gaming machine that can also control the payout rate while giving the possibility of obtaining a high award to a player, wherein a game property or a gamble property can be given to determining the betting target, an increase in the bet magnification based on the bet action.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming machine comprising:

a display;

an operation unit that allows a player to input operations;

a controller that performs game process for providing a game to the player by displaying a progress of the game on the display in accordance with the operations input through the operation unit; and a storage that stores information indicating a first magnification and a second magnification that is larger than the first magnification, wherein the controller performs the game process comprising:

accepting an input of a bet of a game value on the game through the operation unit;

displaying a bet magnification in a bet screen on the display;

after said displaying said bet magnification, accepting an input of a betting target of the bet;

after said accepting the input of the betting target, executing bet magnification change processing, and changing the displayed bet magnification based on the bet magnification change processing;

selecting one of the first magnification and the second magnification based on an amount of the game value bet on the game; and paying out an award that is determined by multiplying the game value bet on the game by the selected one of the first magnification and the second magnification, and wherein the controller performs selecting the first magnification if the amount of the game value bet on the game is less than a predetermined value, and performs selecting the second magnification when the amount of the game value bet on the game is equal to or more than said predetermined value, the predetermined value being determined at random using a random number at a start of the game.

2. The gaming machine according to claim 1, wherein said accepting an input of a betting target of the bet comprises accepting the input of the betting target through the operation unit, the betting target being selected from among a plurality of betting targets, and wherein the controller performs selecting the second magnification when the selected betting target is a predetermined betting target.

3. The gaming machine according to claim 1, wherein the controller performs selecting the second magnification when a time period from a start of the acceptance of the input of the bet to the input of the bet comprises a predetermined time period.

4. The gaming machine according to claim 1, further comprising:

plural player terminals, said display being included in a player terminal of said plural player terminals.

5. The gaming machine according to claim 4, wherein said player terminal further comprises a microcomputer including said storage.

6. The gaming machine according to claim 5, wherein said storage comprises a bet magnification table which includes said first and second bet magnification for plural betting targets.

7. The gaming machine according to claim 6, wherein said microcomputer comprises a central processing unit including a bet acceptance section which accepts said bet of said game value and generates bet information.

8. The gaming machine according to claim 7, further comprising:

a main control unit which receives said bet information from said bet acceptance section and if the player wins the game, generates award information.

9. The gaming machine according to claim 7, wherein said microcomputer comprises another storage including a credit value storage section.

10. The gaming machine according to claim 9, wherein said bet acceptance section determines a bet magnification in response to the amount of the bet, by referencing the credit value storage section and the bet magnification table.

11. The gaming machine according to claim 9, wherein said another storage further comprises a bet magnification storage section which stores the bet magnification determined by the bet acceptance section.

12. The gaming machine according to claim 9, wherein said another storage further comprises a bet value storage section, and when the main control section determines a start of said game, said main control section sends a bet acceptance start notification to the player terminal, and upon reception of the bet acceptance start notification, the bet acceptance section executes bet value specification input acceptance processing in which the player is prompted to input a value of the bet and when the player inputs the value of the bet, the bet value is stored in said bet value storage section.

13. The gaming machine according to claim 12, wherein said another storage further comprises a betting target storage section, and after said bet value is stored in said bet value storage section, the bet acceptance section executes betting target specification input acceptance processing in which the player is prompted to enter specification of the betting target and when the player enters specification of the betting target, information for specifying the specified betting target is stored in the betting target storage section.

14. The gaming machine according to claim 13, wherein after the information for specifying the specified betting target is stored in the betting target storage section, the bet acceptance section executes bet magnification determination processing including determining the bet magnification in response to the bet value specified in the previous bet value specification input acceptance processing.

15. A gaming machine comprising:

a display for displaying a game;

an operation unit for inputting an operation for playing said game;

a controller for performing a game process which provides the game by displaying a progress of the game on the display in accordance with the input operation, the game process comprising:

accepting a bet on the game as the input operation;

displaying a bet magnification in a bet screen on the display;

after said displaying said bet magnification, accepting an input of a betting target of the bet;

after said accepting the input of the betting target, executing bet magnification change processing, and changing the displayed bet magnification based on the bet magnification change processing;

selecting a first magnification if the amount of the bet is less than a predetermined value, and selecting a second magnification which is greater than said first magnification if the amount of the bet is equal to or more than said predetermined value, the predetermined value being determined at random using a random number at a start of the game; and paying out an award that is determined by multiplying the amount of the bet by the selected one of the first magnification and the second magnification.

16. The gaming machine according to claim 1, wherein said accepting the input of the betting target comprises accepting the input of the betting target through the operation unit.

17. The gaming machine according to claim 1, wherein the display comprises a touch screen display, and wherein the bet screen comprises plural betting target buttons, and said accepting the input of the betting target comprises the user touching the touch screen display in an area of a betting target button in the displayed plural betting target buttons.

18. The gaming machine according to claim 17, wherein the bet screen comprises a chip display area and before said accepting the input of the betting target, the controller displays a chip image in the chip display area, and after said accepting the input of the betting target, the controller displays the chip image as moving from the chip display area to the betting target button.

19. A game process for a gaming machine, comprising:

accepting a bet on a game as an input operation;

displaying a bet magnification in a bet screen on the display of the gaming machine;

after said displaying said bet magnification, accepting an input of a betting target of the bet;

after said accepting the input of the betting target, executing bet magnification change processing, and changing the displayed bet magnification based on the bet magnification change processing;

selecting a first magnification if an amount of the bet is less than a predetermined value, and selecting a second magnification which is greater than said first magnification if the amount of the bet is equal to or more than said predetermined value, the predetermined value being determined at random using a random number at a start of the game; and paying out an award that is determined by multiplying the amount of the bet by the selected one of the first magnification and the second magnification.

* * * * *